(12) United States Patent
Kurtz et al.

(10) Patent No.: US 7,097,240 B2
(45) Date of Patent: Aug. 29, 2006

(54) LOCKING MECHANISM WITH ROTATABLE FEATURES

(75) Inventors: Daniel D. Kurtz, Concord, NC (US); Donald E. Krueger, Stony Point, NC (US)

(73) Assignee: NASCAR, Inc., Daytona Beach, FL (US)

( * ) Notice: Subject to any disclaimer, the term of this patent is extended or adjusted under 35 U.S.C. 154(b) by 0 days.

(21) Appl. No.: 10/912,490

(22) Filed: Aug. 5, 2004

(65) Prior Publication Data

US 2006/0028057 A1   Feb. 9, 2006

(51) Int. Cl.
*B60J 7/08* (2006.01)
*B60J 7/19* (2006.01)

(52) U.S. Cl. .............. 296/218; 296/224; 49/141; 292/21; 292/DIG. 5; 292/DIG. 65; 16/232

(58) Field of Classification Search .............. 296/218, 296/224, 121; 49/141; 292/21, DIG. 5, 292/DIG. 65, DIG. 71; 16/231, 232
See application file for complete search history.

(56) References Cited

U.S. PATENT DOCUMENTS

| 408,795 | A | | 8/1889 | Craig |
|---|---|---|---|---|
| 1,538,283 | A | | 5/1925 | Gertsfeld |
| 2,389,315 | A | * | 11/1945 | Kerr .............................. 292/21 |
| 2,469,159 | A | * | 5/1949 | Dombrowiak ................ 292/37 |
| 2,565,856 | A | * | 8/1951 | Kerr .............................. 292/21 |
| 3,603,636 | A | | 9/1971 | Carella et al. |
| 3,712,665 | A | * | 1/1973 | Klein ........................... 296/218 |
| 3,743,335 | A | * | 7/1973 | Reilhac et al. .............. 292/127 |
| 3,913,971 | A | | 10/1975 | Green |
| 4,154,474 | A | | 5/1979 | Hough et al. |
| 4,165,120 | A | | 8/1979 | Jardin et al. |
| 4,523,785 | A | | 6/1985 | Draper et al. |
| 4,819,985 | A | | 4/1989 | Williams |
| 4,869,549 | A | | 9/1989 | Londeck et al. |
| 4,997,218 | A | | 3/1991 | Culling ......................... 292/60 |
| 5,137,327 | A | | 8/1992 | Edmonds et al. .......... 296/224 |
| 5,174,063 | A | | 12/1992 | Lewis et al. .................. 49/141 |
| 5,280,973 | A | | 1/1994 | Culling ......................... 292/58 |
| 6,216,391 | B1 | | 4/2001 | Garrett, Jr. .................... 49/141 |
| 2003/0075948 | A1 | | 4/2003 | De Gaillard ............. 296/146.8 |

FOREIGN PATENT DOCUMENTS

| DE | 4011902 | * | 5/1991 | ................ 296/224 |
|---|---|---|---|---|
| FR | 2616474 | * | 12/1988 | ................ 296/224 |
| JP | 0175427 | * | 10/1982 | ................ 296/218 |

* cited by examiner

*Primary Examiner*—Dennis H. Pedder
(74) *Attorney, Agent, or Firm*—Michael L. Leetzow, P.A.

(57) ABSTRACT

A locking mechanism is described that releasably locks at least two objects together. The locking mechanism allows one of the objects to be rotatably connected to the other, allowing for a variety of uses. The rotatability and releasability of the locking mechanism allows several locking mechanisms to be used together as an escape hatch system, particularly for use in race vehicles. The locking mechanism has uses beyond the escape hatch system and is applicable to doors, cover, and other objects that are rotatably attached to a second object.

20 Claims, 7 Drawing Sheets

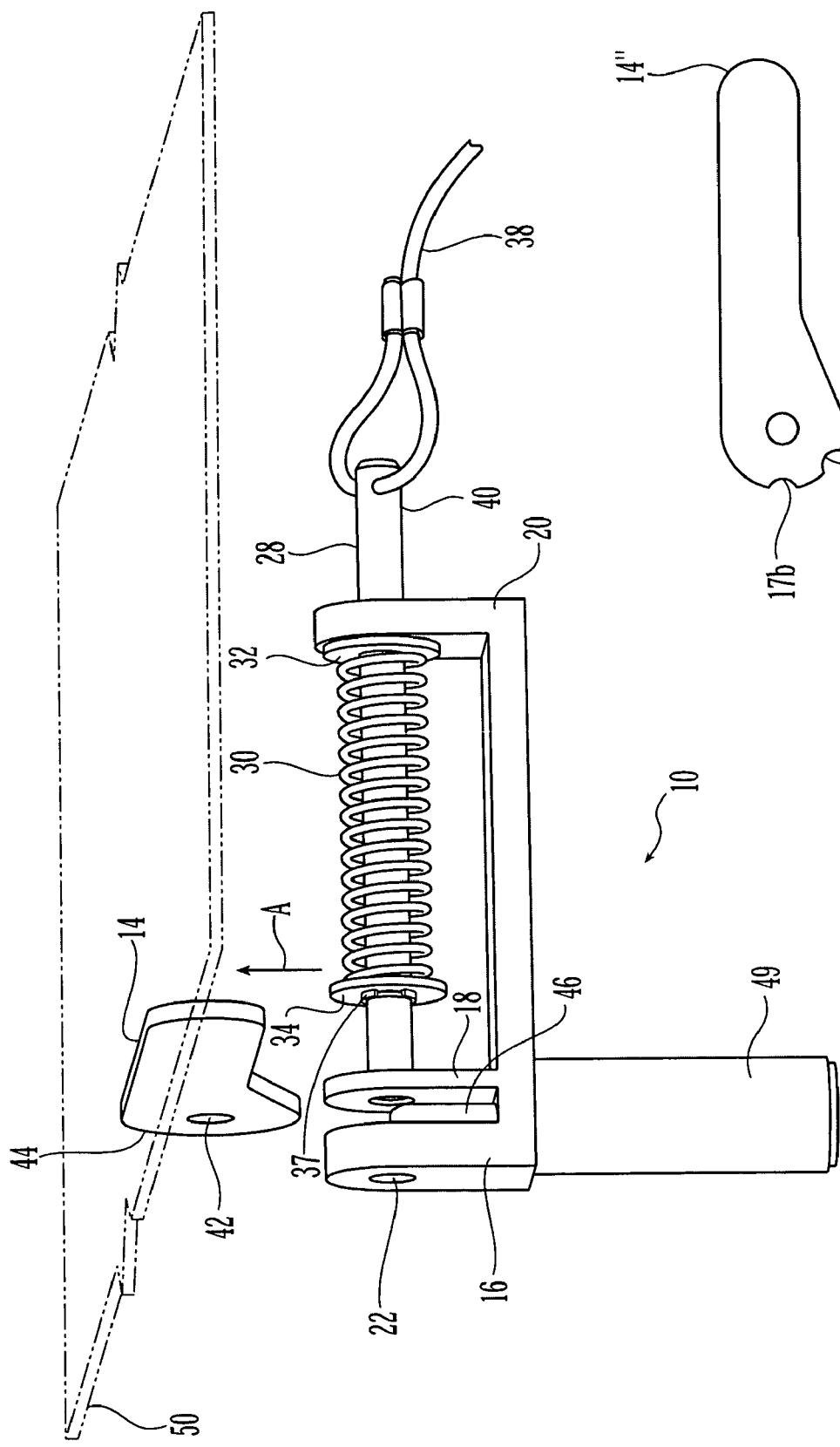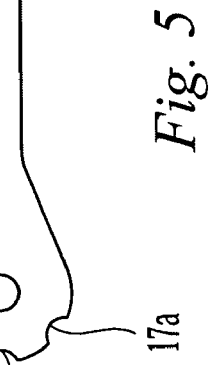

LOCKING MECHANISM WITH ROTATABLE FEATURES

The present invention relates to a locking mechanism for at least two objects that allows one of the objects to be rotatable relative to the other and, and more particularly, a locking mechanism that ejects one of the locked components upon release and also allows the locking mechanism to be used in a vehicle as a part of an escape hatch system.

There are prior locking mechanisms, but none that allow for the ejection and rotatability of the locked components once the lock has been released. Some of the mechanisms have specific biasing mechanisms for locking the components or specific configurations of the components. However, none of the prior art references disclose the components of the present invention.

Accordingly, the present invention is directed to a new and novel locking mechanism without one or more of the limitations of the prior art. Additional features and advantages of the invention will be set forth in the description that follows, and in part will be apparent from the description, or may be learned by practice of the invention. The objectives and other advantages of the invention will be realized and attained by the process particularly pointed out in the written description and claims, as well as the appended drawings.

SUMMARY OF THE INVENTION

To achieve these and other advantages and in accordance with the purpose of the invention as embodied and broadly described herein, the invention is directed to a mechanism for releasably locking at least two objects including a base portion, the base portion having at least two openings along an axis, the base portion being mountable on a first of the at least two objects, an engagement member mountable upon a second of the at least two objects, the engagement member configured to be disposed adjacent at least one of the at least two openings and having an opening to align with the at least two openings, an engagement pin translatable in the at least two openings in the base portion and configured to engage the opening in the engagement member to secure the engagement member relative to the base portion, a first bias member associated with the engagement pin to bias the engagement pin along the axis, and a second bias member associated with the base portion to bias the engagement member away from the base portion.

In another aspect, the invention is directed to a mechanism for releasably locking at least two objects including a base portion, the base portion having at least two openings along an axis, the base portion being mountable on a first of the at least two objects, an engagement member mountable upon a second of the at least two objects, the engagement member configured to be disposed adjacent at least one of the at least two openings and having an opening to align with the at least two openings, an engagement pin translatable in the at least two openings in the base portion and configured to engage the opening in the engagement member to secure the engagement member relative to the base portion, and a bias member associated with the base portion to bias the engagement member away from the base portion.

In yet another aspect, the present invention is directed to an escape hatch system for a vehicle including at least two engagement members attached to a roof panel portion, each of the at least two engagement members each having an opening therein, and at least two base portions attached to the vehicle to secure the roof panel relative the vehicle, each of the base portions having at least two openings along an axis thereof, each of the base portions further including an engagement pin translatable in the at least two openings in the base portion and configured to engage the opening in the engagement member, a first bias member associated with the engagement pin to bias the engagement pin along the axis, and a second bias member associated with the base portion to bias the engagement member away from the base portion.

In another aspect, the invention is directed to an escape hatch system for a vehicle including at least two engagement members attached to a roof panel portion, each of the at least two engagement members each having an opening therein, and at least two base portions attached to the vehicle to secure the roof panel relative to the vehicle, each of the base portions having an engagement pin configured to engage the opening in the engagement member and a bias member associated with the base portion to bias the engagement member away from the base portion.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

BRIEF DESCRIPTION OF THE DRAWINGS

FIG. 2 is the locking mechanism of FIG. 1 in an unsecured position;

FIG. 5 illustrates another alternative engagement member for use with the locking mechanism according to another embodiment of the present invention;

DETAILED DESCRIPTION OF THE INVENTION

Figure 1:
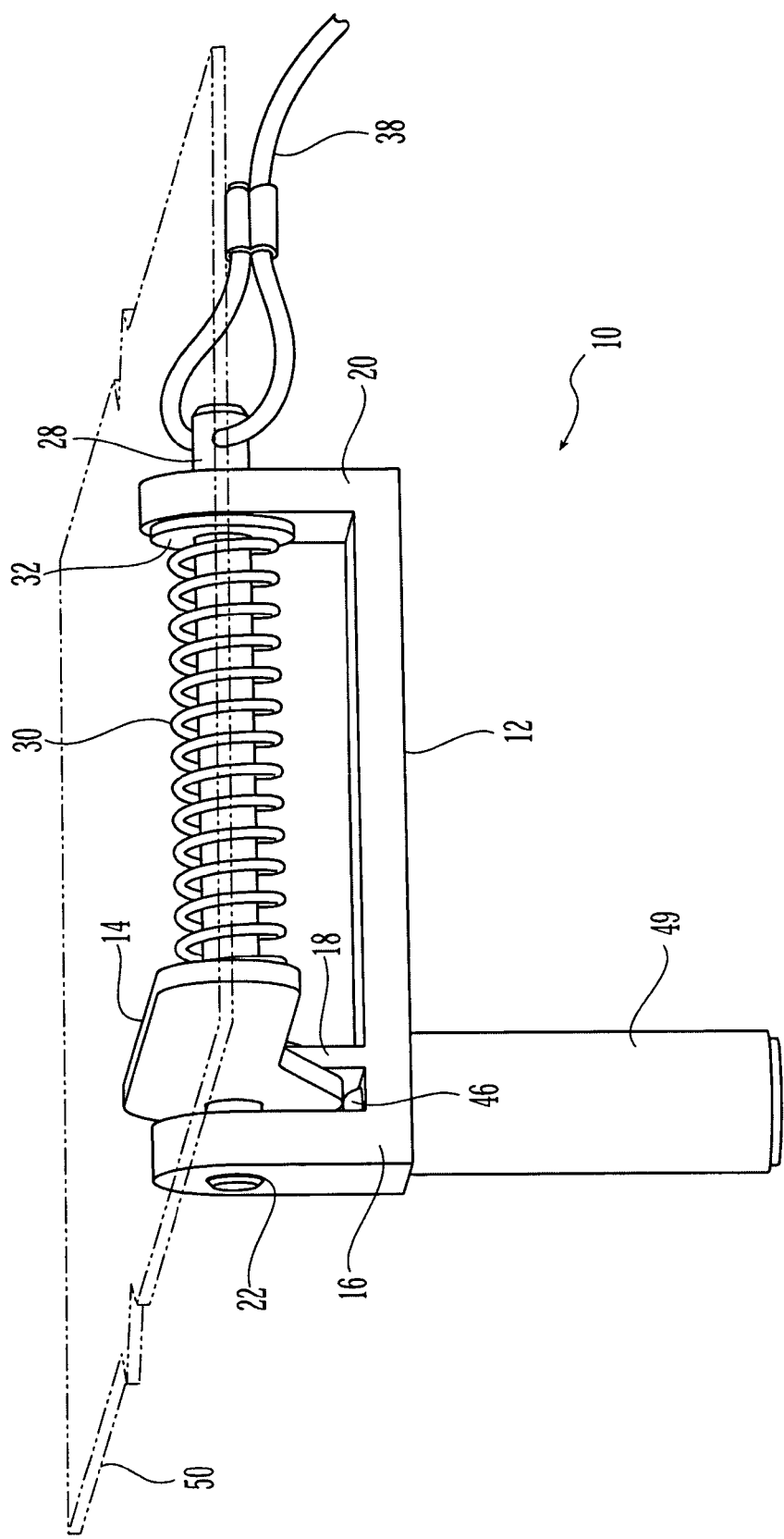
FIG. 1 is a locking mechanism illustrated in a secured position according to one embodiment of the present invention.
Figures 3, 4:
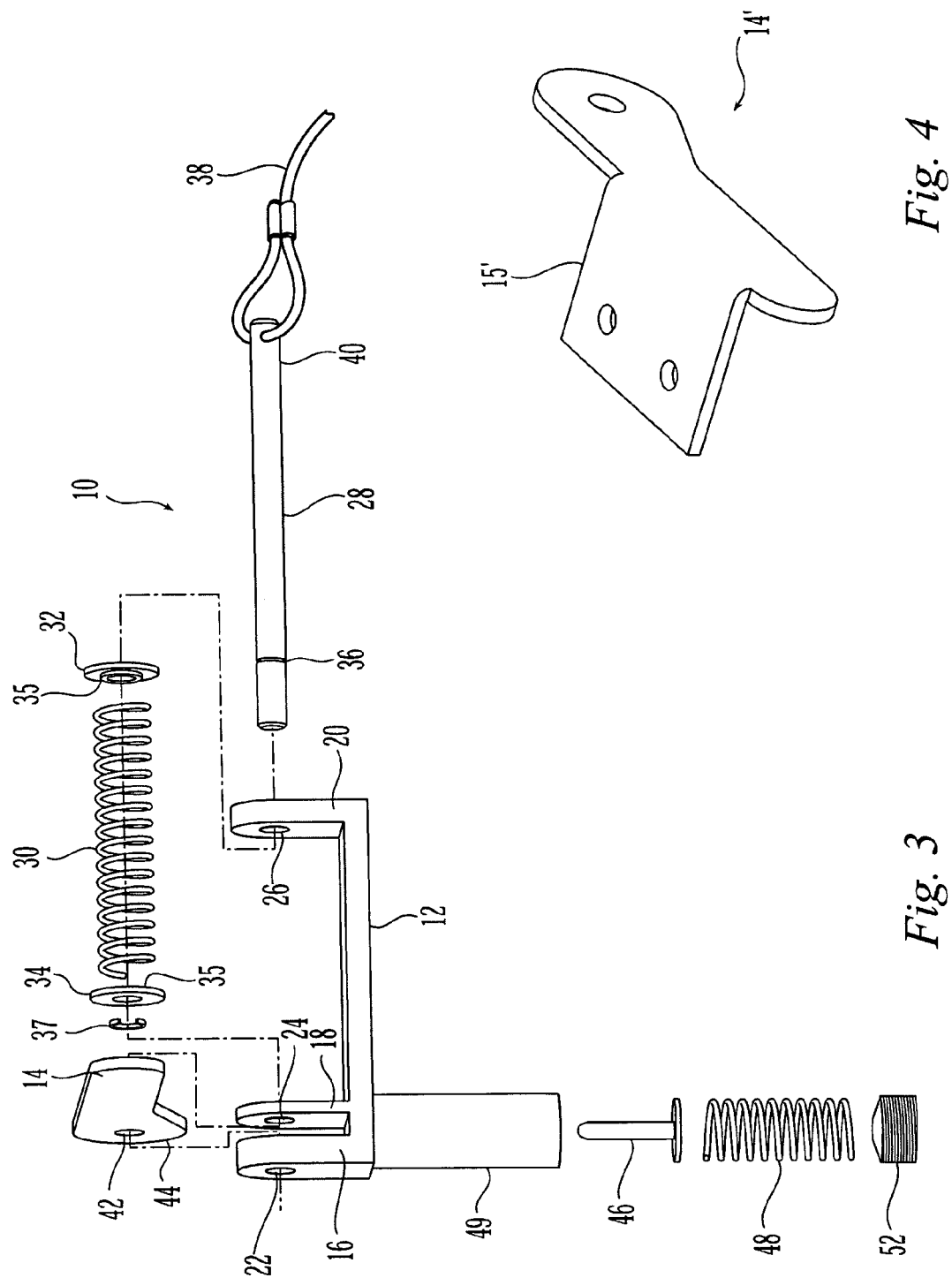
FIG. 3 an exploded view of the locking mechanism of FIG. 1.
FIG. 4 is an alternative engagement member for use with the locking mechanism according to another embodiment of the present invention.

FIGS. 1–3 illustrate one embodiment of the locking mechanism 10 according to the present invention. The locking mechanism 10 has a base portion 12 and an engagement member 14. The base portion 12 preferably has three flanges 16,18,20, each having an opening 22,24,26 there-through. An engagement pin 28 preferably passes through the openings 22,24,26 in the three flanges 16,18,20. See FIG. 3. While the opening 22 is illustrated in each of the figures to be completely through the flange 16, it need not be completely through the flange 16. Rather, the opening 22 could simply be a depression or partial opening in the flange 16. Similarly, the openings 22,24,26 need not be complete holes as illustrated, but could be any type of opening, e.g., slots, key-holes, etc.

The engagement pin 28 is translatable in the openings 24,26 and is biased in the direction of the flange 16 by the spring 30. The spring 30 is shown to be a helical spring, but could be of any appropriate form. As best illustrated in FIGS. 2 and 3, the spring 30 preferably has a washer 32,34 at each end. While the washers are shown to be independent of the spring 30, they could also be integral with the spring 30. The washers 32,34 also preferably have raised center portion 35 on at least one side of the washer 32,34 to assist centering the helical spring 30 about the engagement pin 28. If the spring 30 were only slightly larger than the engagement pin 28, then the washers 32,34 would not need to have a raised center portion 35 in order to center the spring 30. Additionally, the washer 32 may be omitted from the locking mechanism 10, if the flange 20 were large enough to engage the spring 30. The flange 20 may also have a configuration to assist in centering the spring 30 if so desired. Similarly, the washer 34 may be omitted if the spring 30 were attached to the engagement pin 28 to provide the needed bias. The washers 32,34 may also be cup type washers, e.g., having a flange around the circumference of the washers 32,34, to assist in centering the spring 30 about the engagement pin 28.

The engagement pin 28 also preferably has a snap ring 37 that engages the groove 36. The washer 34 then contacts the snap ring 37 to provide an engagement surface for the spring 30. Instead of having the washer 34 and the snap ring 37, the washer 34 could also be integral with the engagement pin 28, eliminating the need for the snap ring 37.

As illustrated in FIG. 1, the engagement pin 28 is biased toward flange 16 and has a pull cord 38 on its first end 40. The engagement pin 28 passes through an opening 42 in the engagement member 14. As with the other openings 22,24, 26, the opening 42 need not be in the form shown, but would still be within the scope of the present invention. With the engagement pin 28 passing through the opening 42, the engagement member 14, and any object to which it is attached, is secured to the base portion 12. The engagement member 14 preferably has at least one rounded portion 44 to allow the engagement member 14 to rotate around the engagement pin 28 as illustrated by the arrow A in FIG. 1. It should be noted that the engagement member 14 may be of any appropriate shape that allows rotation of the engagement member 14 around the engagement pin 28 for the reasons noted below. See also FIGS. 4, 6, and 8.

While a cord 38 is shown in the figures for disengaging the engagement pin 28 from the engagement member 14, any mechanical release could be used. For example, a cam could be used, which when rotated, would pull the engagement pin 28 from the engagement member 14. Similarly, a bell crank, a neck linkage, etc. would all be within the scope of the present invention.

The base portion 12 also has a bias pin 46 and spring 48 in a cylindrical portion 49 as illustrated in FIG. 3. The spring 48 is again a helical spring, but could be any type of spring or elastic element. The bias pin 46 and spring 48 are secured within the cylindrical portion 49 of the base portion 12 with a plug 52. As illustrated in FIG. 3, the plug 52 has threads on it to mate with similar threads (not shown) on the inside of the cylindrical portion 49. However, any method of securing the spring 48 and bias pin 46 within the cylindrical portion 49 are within the scope of the present invention. For example, a smooth plug with a set screw or pin could be used. It should also be noted that while the bias pin 46 is cylindrical in shape, it could also be of any appropriate shape. For example, the bias pin 46 could be rectangular, square or any other shape in cross section, rather than circular as illustrated in FIG. 3.

The bias pin 46 has an upper portion 46a and a base portion 46b. The spring 48 biases the upper portion 46a of the bias pin 46 upward into the area between the flanges 16,18. As indicated in the figures and as noted above, this area is where the engagement member 14 is positioned to be secured. When the engagement pin 28 is pulled by the pulling cord 38 (see FIG. 1) and exits the opening 42 in the engagement member 14 (see FIG. 2), the upper portion 46a of bias pin 46 pushes the engagement member 14 away from the base portion 12. The bias pin 46 also preferably has sufficient length to extend into the space between the two flanges 16,18 thereby preventing the engagement pin 28 from reentering the space between the two flanges 16,18 and opening 22. See FIG. 2. The base portion 46b engages the upper portion of cylindrical portion 49 to prevent the bias pin 46 from being ejected. This allows the engagement member 14 to be reinserted without having to pull the engagement pin 28 out. The operator only needs to overcome the bias force of the spring 48 to reengage the engagement member 14 with the engagement pin 28.

As an alternative bias arrangement, a spring element could instead be attached to the engagement member 14 and disposed so as to engage the base portion 12. When the engagement pin 28 is removed, the alternative spring element (not shown) would also bias the engagement member 14 away from the base portion 12.

Typically, the engagement member 14 is soldered or otherwise secured directly to one object 50 that needs to be secured. As illustrated in dotted lines in FIGS. 1 and 2, the object 50 may be a generally flat member, such as a portion of a car roof, a door, a body panel, a lid, tail gates on a truck, etc. The object 50 may be any object that needs to be secured and may rotate about one edge.

Another embodiment of an engagement member according to the present invention is illustrated in FIG. 4. The engagement member 14' may also have a flange 15' which allows the engagement member to be secured in a more typical manner, i.e., screws, rivets, etc.

Another embodiment of an engagement member 14" according to the present invention is illustrated in FIG. 5. The engagement member 14" preferably has indented portions 17a,17b along one edge. The indented portions 17a, 17b are configured to cooperate with the top portion of the bias pin 46. As described in more detail below, the object (e.g. object 50) that needs to be able to rotate around the engagement pin 28 may also need be held in one position. The indented portions 17a,17b provide a detent-like position for the bias pin 46. While two indented portions are shown in FIG. 5, more or fewer may be used. Similarly, the indented portions may be deeper or shallower, depending on the object 50, the spring 48, and bias pin 46.

One use of the locking mechanism 10 of the present invention may be with a vehicle and a portion of a vehicle roof. As illustrated in FIGS. 6–9, several of the locking mechanisms 10 are illustrated in use as an escape hatch system for a race car. However, the locking mechanisms 10 could be used with any type of vehicle (e.g., a truck, car, sprint car, military vehicle, etc.) and could be used at any appropriate location on the vehicle. While the description below is related to the roof of the vehicle, it may also apply to any location on the vehicle (door, tail gate, body panel, etc.). It should also be noted that the locking mechanism could be, as noted above, used in a variety of other situations where a locking mechanism is needed.

Figure 6:
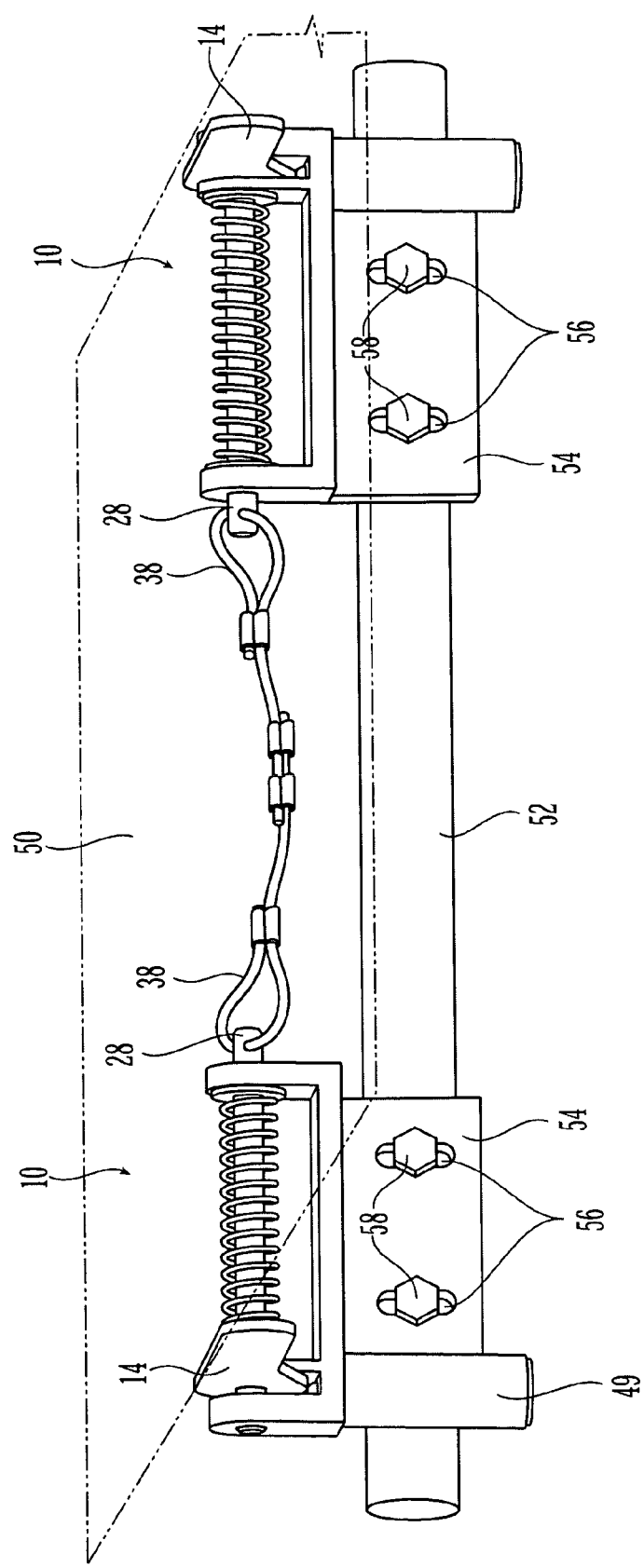
FIG. 6 illustrates two locking mechanisms with the base portion attached to a portion of a first object and the corresponding engagement member attached to a second object.

Two of the locking mechanisms 10 are illustrated in FIG. 6 attached to a portion 52 of a vehicle. The portion 52 of the vehicle illustrated in FIG. 6 is a roll bar in a race vehicle, but could be any stable, secure portion of the vehicle. The base portion 12 of the locking mechanism 10 also preferably has a securing portion 54 with at least one hole 56 therein for securing the locking mechanism 10 to the vehicle portion 52. The base portion 12 of the locking mechanism 10 can be secured with bolts 58 to the vehicle portion 52. However, base portion 12 of the locking mechanism 10 can be secured to the vehicle in any appropriate manner, e.g., welding, rivets, screws, fasteners, metal adhesives, etc.

Two locking mechanisms 10 are illustrated to be along one side of the object 50 to which engagement members 14 are attached. The engagement pins 28 each have a pull cord 38, which in turn are attached to one another. As noted above, however, any mechanical release may be appropriate. The operator can reach up and pull the pull cords 38 with one quick movement. When the engagement pins 28 are pulled toward each other and back through the openings 42 in the engagement members 14, the bias pins 46 biased upward by the springs 48 (not visible in FIG. 6) push the engagement elements 14 out of the base portion 12 to release that side of object 50. The opposite edge of the object 50 can also have two locking mechanisms 10, which would allow the object to rotate around the corresponding engagement pins 28, or it may have any other appropriate configuration to allow the object to rotate (i.e., a hinge). Such a configuration is also illustrated in FIGS. 7–9.

Figure 7:
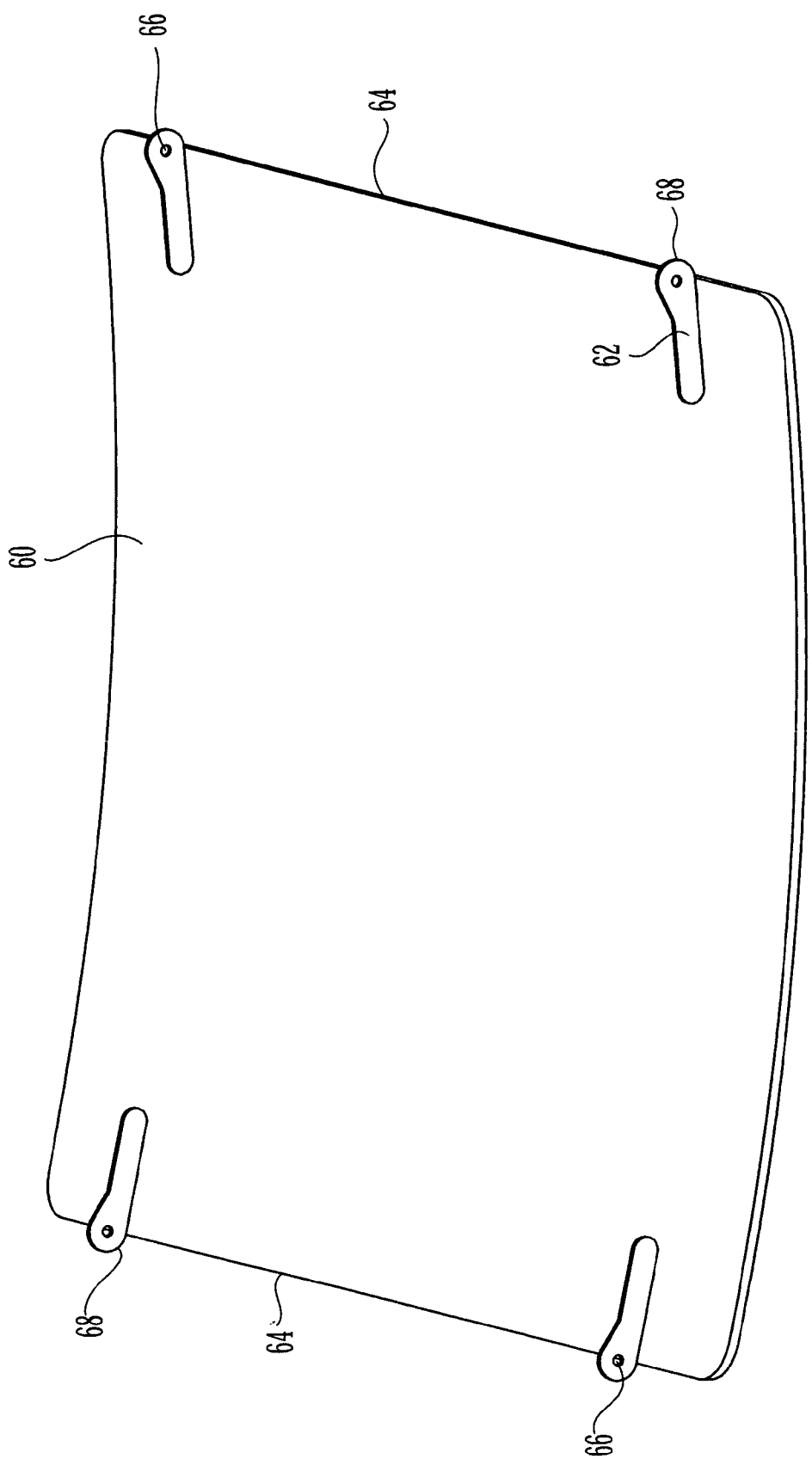
FIG. 7 illustrates four engagement members of four corresponding locking mechanisms that are attached to a portion of a roof panel according to another embodiment of the present invention.

FIG. 7 illustrates a roof portion 60 that has four engagement members 62, two along each of the opposing sides 64. The engagement members 62 are slightly different in configuration from the engagement members 14 in that they are integrally formed with the roof portion 60 and are more streamlined than engagement members 14 illustrated above. However, the engagement members 62 also have openings 66 and rounded portions 68 as with engagement members 14.

Figure 8:
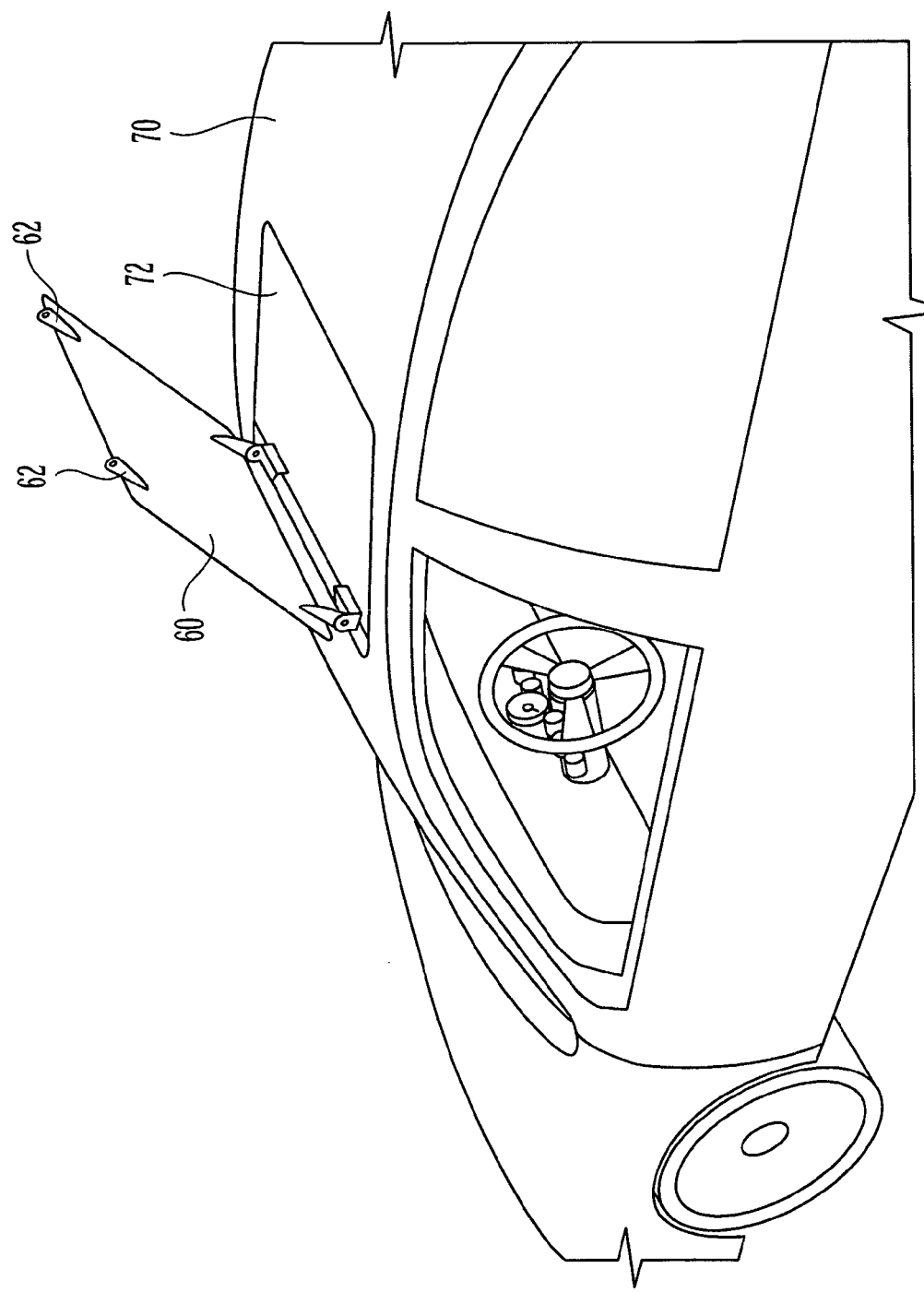
FIG. 8 illustrates the operation of the locking mechanisms as used as a part of an escape hatch system according to one embodiment of the present invention.
Figure 9:
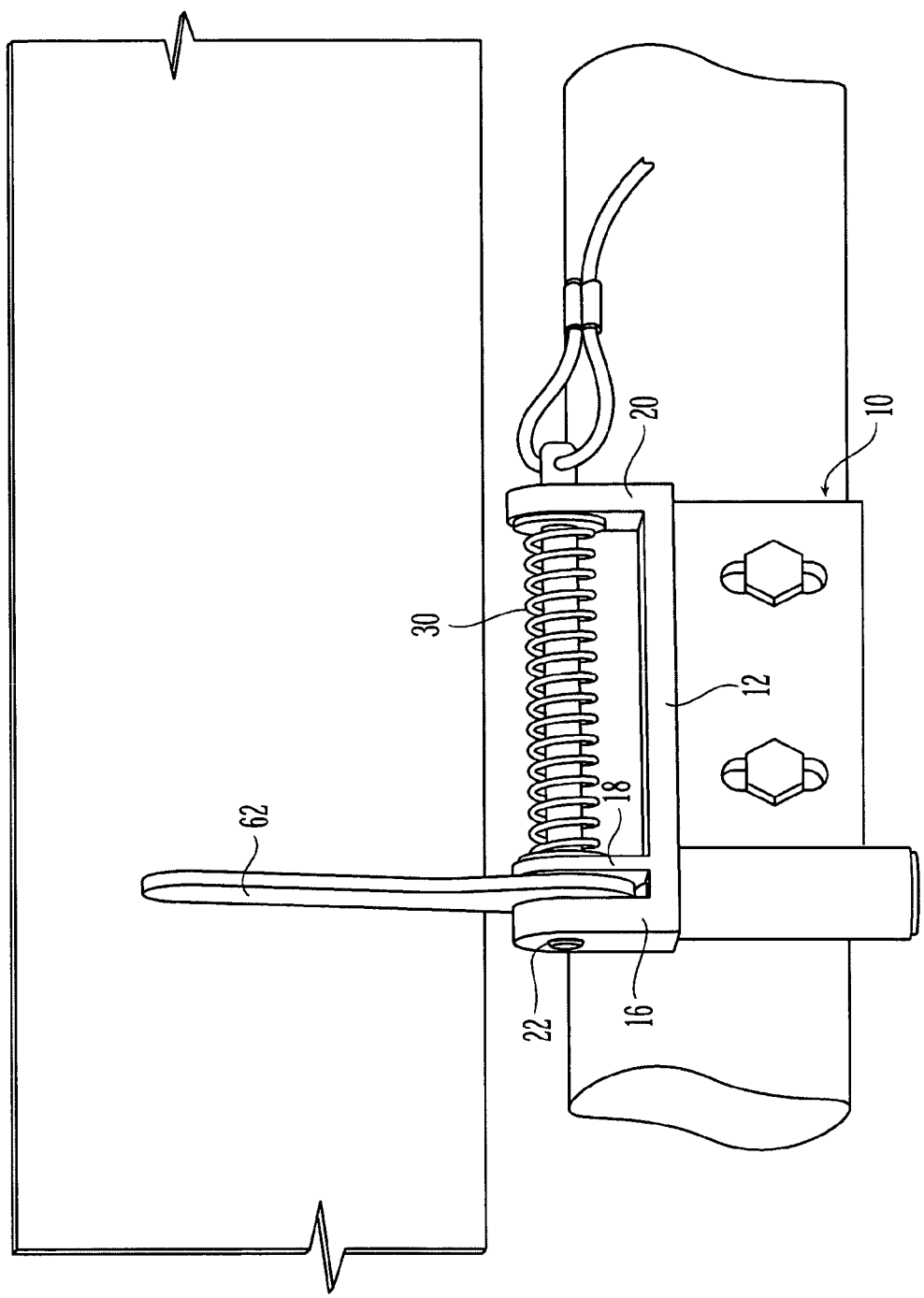
FIG. 9 illustrates an engagement member of a locking mechanism according to one embodiment of the present invention being rotated around the engagement pin as illustrated in FIG. 8.

The roof portion 60 is then used in conjunction with a vehicle 70 having a corresponding opening 72 to be used as an escape hatch system from the vehicle as shown in FIG. 8. Typically, the vehicle 70 is a specialized vehicle in which the escape hatch system would be used only in emergencies, such as in a race car. The roof portion 60 is illustrated in FIG. 8 in the open position, when two of the locking mechanisms 10 (not visible in the rear side of the opening 72) have had the engagement pins pulled (as illustrated in FIG. 2) and the front two of the engagement members 62 are rotated about the engagement pins, one of which is illustrated in FIG. 9. While the rear engagement pins have released the engagement members 62 in FIG. 8, the front locking mechanisms could have released the engagement members 62 and the roof portion 60 would have rotated about the engagement pins on the rear side of the opening 72, with the roof portion opening toward the back of the vehicle 70. It should also be noted that while the locking mechanisms 10 have been located on the front and back of the opening 72, they could have been located along the sides of the opening 72 as well. It is also noted that if the driver pulls on both sets (i.e., the front and back, or in the case that they are on the sides, both sides), then the entire roof portion 60 will be removable.

It will be apparent to those skilled in the art that various modifications and variations can be made to the mechanism according to the present invention without departing from the spirit or scope of the invention. Thus, it is intended that the present invention cover the modifications and variations of this invention provided they come within the scope of the appended claims and their equivalents.

We claim:

1. A mechanism for releasably locking at least two objects comprising:
    a base portion, the base portion having at least two openings along an axis, the base portion being mountable on a first of the at least two objects;
    an engagement member mountable upon a second of the at least two objects, the engagement member configured to be disposed adjacent at least one of the at least two openings and having an opening to align with the at least two openings;
    an engagement pin translatable in the at least two openings in the base portion between a first pin position and a second pin position and configured to engage the opening in the engagement member to secure the engagement member relative to the base portion in the first pin position;
    a first bias member associated with the engagement pin to bias the engagement pin along the axis; and
    a second bias member associated with the base portion and movable between a first bias position and a second bias position, the second bias member extending through an opening in the base portion to engage and bias the engagement member away from the base portion, and wherein in the second bias position the second bias member at least partially intersects the axis and prevents the engagement pin from returning to the first pin position.

2. The mechanism of claim 1, wherein the second bias member ejects the engagement member from the base portion when the engagement pin is removed from the opening in the engagement member.

3. The mechanism of claim 1, wherein the first bias member comprises a helical spring disposed around the engagement pin.

4. The mechanism of claim 1, wherein the second bias member includes a spring element and a pin.

5. The mechanism of claim 1, wherein the engagement member is configured to be rotatable around the engagement pin relative to the base portion.

6. The mechanism of claim 1, wherein the engagement member is attached to a roof panel portion and the base portion is attached to a portion of a vehicle to allow the roof panel to open.

7. A locking mechanism for releasably locking at least two objects, the locking mechanism comprising:
    a base portion mountable upon a first object of the at least two objects;
    an engagement member mountable upon a second object of the at least two objects;
    a locking member associated with the base portion, the locking member being capable of moving axially between a first position and a second position, and being capable of releasably securing the engagement member in the first position; and
    an ejection member disposed in the base member and movable through an opening in the base member to directly engage and bias the engagement member away from the base portion, the ejection member axially movable between a first position and a second position and in the second position the ejection member biases the engagement member away from the base member and prevents the locking member from returning to the first position.

8. The locking mechanism according to claim 7, wherein the ejection member has a bias member associated therewith.

9. The locking mechanism according to claim 7, wherein the ejection member is a bias member.

10. The locking mechanism according to claim 7, further comprising a second bias member associated with the locking member for biasing the locking member toward the first position.

11. The locking mechanism according to claim 7, wherein the base portion defines at least one opening along an axis for receiving the locking member.

12. The locking mechanism according to claim 11, wherein the locking member is translatable in the at least one opening defined by the base portion.

13. The locking mechanism according to claim 7, wherein the engagement member defines at least one opening for receiving the locking member.

14. An escape hatch system for a vehicle comprising:
at least two engagement members attached to a roof panel portion, each of the at least two engagement members each having an opening therein; and
at least two base portions attached to the vehicle to secure the roof panel relative the vehicle, each of the base portions having at least two openings along an axis thereof, each of the base portions further comprising:
an engagement pin translatable in the at least two openings in the base portion between a first pin position and a second pin position and to engage the opening in the engagement member in the first pin position;
a first bias member associated with the engagement pin to bias the engagement pin along the axis; and
a second bias member associated with the base portion and movable between a first bias position and bias second position, the second bias member extending through an opening in the base portion to engage and bias the engagement member away from the base portion, and wherein in the second bias position the second bus member prevents the engagement pin from returning to the first pin position.

15. The escape hatch system of claim 14, wherein the at least two engagement members comprises at least four engagement members and the at least two base portions includes at least four base portions.

16. The escape hatch system of claim 15, wherein two of engagement members are located along a first edge of the roof panel portion and two of the engagement member are located along a second edge of the roof panel portion, the first edge being located across the roof panel portion from the second edge.

17. The escape hatch system of claim 14, wherein the second bias member ejects the engagement member from the base portion when the engagement pin is removed from the opening in the engagement member.

18. The escape hatch system of claim 14, wherein the first bias member comprises a helical spring disposed around the engagement pin.

19. The escape hatch system of claim 14, wherein the second bias member includes a spring element and a pin.

20. The escape hatch system of claim 14, wherein the engagement member is rotatably movable relative to the base portion.

* * * * *